United States Patent [19]

Felsenstein

[11] 4,141,003

[45] Feb. 20, 1979

[54] CONTROL DEVICE FOR VIDEO DISPLAY MODULE

[75] Inventor: Lee Felsenstein, Berkeley, Calif.

[73] Assignee: Processor Technology Corporation, Emeryville, Calif.

[21] Appl. No.: 766,452

[22] Filed: Feb. 7, 1977

[51] Int. Cl.² .............................................. G06K 15/20

[52] U.S. Cl. ...................................... 340/799; 364/900

[58] Field of Search ................................. 340/324 AD

[56] References Cited

U.S. PATENT DOCUMENTS

| | | | |
|---|---|---|---|
| 3,505,650 | 4/1970 | Brown | 340/324 AD |
| 3,676,850 | 7/1972 | Goldman et al. | 340/324 AD |
| 3,821,731 | 6/1974 | Levine | 340/324 AD |
| 3,913,089 | 10/1975 | Albrecht | 340/324 AD |
| 4,045,789 | 8/1977 | Bristow | 340/324 AD |
| 4,068,225 | 1/1978 | Lee | 340/324 AD |

*Primary Examiner*—David L. Trafton

*Attorney, Agent, or Firm*—Harris Zimmerman

[57] ABSTRACT

A control device for a video display module includes means for scrolling the displayed alpha-numeric data either up or down, means for displaying the top line of the displayed data from the top of the video screen, and means for selecting the starting point within a memory system at which the display of alpha-numeric data commences. The device includes an address register and a displacement register which store the memory address at which display commences, and the displacement of the beginning of the display from the top of the screen, respectively. Each register feeds a respective displacement counter and an address counter. Loading of the displacement counter is actuated by the vertical retrace signal, while loading of the address counter is actuated at the time when the displacement counter reaches zero. The address counter is incremented by the text line advance signal of the display circuitry, and the address counter output is connected to the internal memory line address input. The video display is inhibited by a signal from a latch which is set by the vertical retrace signal and reset when the displacement counter reaches zero.

4 Claims, 7 Drawing Figures

| LINE NUMBER | MEMORY CONTENTS |
|---|---|
| 1 | DIGITAL |
| 2 | DATA |
| 3 | QUITE |
| 4 | FULL |
| 5 | OF |
| 6 | ERRATA |

FIG_4

ADDRESS = 1
DISPLACEMENT = 3

| |
|---|
| ( BLANK ) |
| ( BLANK ) |
| ( BLANK ) |
| DIGITAL |
| DATA |
| QUITE |

FIG_5

ADDRESS = 1
DISPLACEMENT = 1

| |
|---|
| ( BLANK ) |
| DIGITAL |
| DATA |
| QUITE |
| FULL |
| OF |

FIG_6

ADDRESS = 3
DISPLACEMENT = 2

| |
|---|
| ( BLANK ) |
| ( BLANK ) |
| QUITE |
| FULL |
| OF |
| ERRATA |

FIG_7

CONTROL DEVICE FOR VIDEO DISPLAY MODULE

BACKGROUND OF THE INVENTION

The following United States patents are known by applicant to be pertinent to the present invention:

| | |
|---|---|
| 3,848,232 | 3,623,068 |
| 3,827,041 | 3,593,316 |
| 3,803,584 | 3,582,936 |
| 3,772,676 | 3,396,377 |
| 3,641,555 | 3,389,404 |
| 3,624,633 | 3,346,853 |

In the prior art, as exemplified by the patents cited in the foregoing, it is know to provide a video display device with a random access memory which stores digital codes representative of strings of text characters and define the manner and position in which they are to be displayed on a cathode ray tube output device. Usually there is mapping circuitry and display generation associated with the RAM which converts the memory contents of the RAM into alpha-numeric display characters, and which uses the display commands from the RAM to position the alpha-numeric characters on the display screen.

Usually the circuitry is arranged so that display of strings of text characters occurs in fixed sequences, one line following another. This takes the display format out of the hands of the computer operator. In many situations, this is the most efficient form of information display.

In some circumstances it would be more advantageous for the computer operator to have more control over the display format. For example, in text editing, information retrieval, and error checking of incoming data, it would be beneficial to permit the computer operator to control the display format. That is, the computer operator could select not only the address of the memory contents to be displayed, but also the format in which the data appears on the display screen.

These control functions may best be provided in a video display module which is distinct from the central processing unit, so that the program may run undisturbed while information is retrieved by the operator from the RAM of the display module itself. This arrangement would consume less computing time of the contral processor.

SUMMARY OF THE PRESENT INVENTION

The present invention generally comprises a control device for presenting an alpha-numeric display in a selectable format on a video display module. It includes an interface which couples the video display module to a central processing unit, and a local memory connected to the interface which stores incoming data from the control processor. Alpha-numeric character-generating circuitry is also provided and is connected between the local memory and the video drive circuits.

The control device of the present invention includes a parameter memory which stores two display parameters provided by the central processor through the interface. One of these parameters is the address within the local memory at which the display is to commence. The other parameter is a displacement number which determines the vertical distance from the top of the display screen at which the display commences.

The parameter memory is connected to a displacement counter and an address counter. These counters are incremented as the display progresses, so that the initiation of display and the address of data obtained from the local memory will keep pace with the display beam position on the video screen.

A BRIEF DESCRIPTION OF THE DRAWINGS

FIGS. 4 through 7 are a series of schematic representations of various line address and displacement parameters and their effect on the video display of alpha-numeric data.

DESCRIPTION OF THE PREFERRED EMBODIMENT

Figure 1:
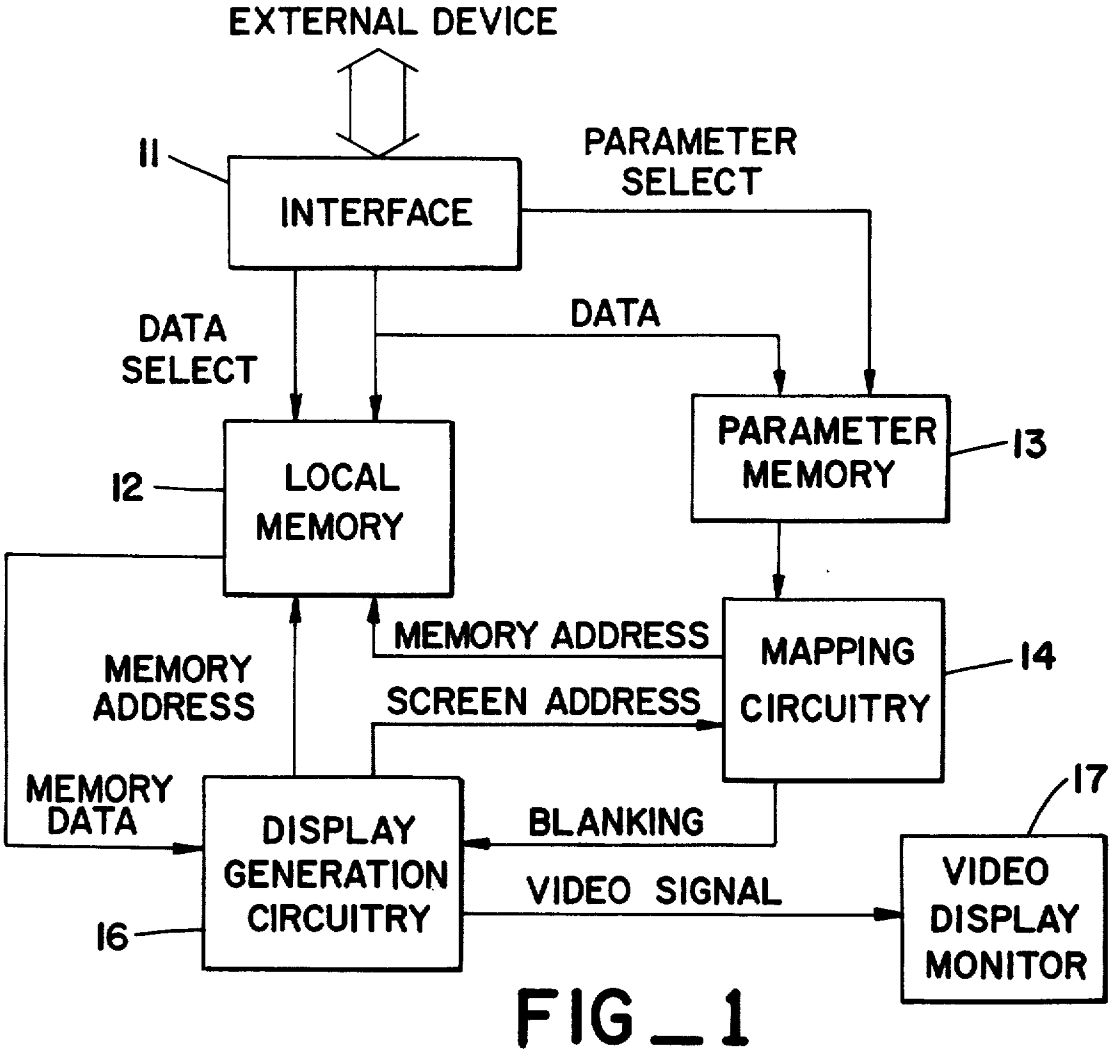
FIG. 1 is a block diagram representation of a video display module including the present invention.

With reference to FIG. 1, a video display module embodying the present invention includes an interface 11 which connects to an external device such as a central processing unit. The interface may include data storage registers or the like as is well known in the prior art. A local memory 12 which is preferably a random access memory is connected to the interface. The memory 12 stores data which may be displayed on a video display module. A parameter memory 13 is also connected to the interface, for storing parameters which effect a particular display format on the video display monitor. The parameter memory is connected to mapping circuitry 14, the parameters from the memory 13 operating on the mapping circiutry 14 to effect the desired format. The mapping circuitry output is connected to the local memory 12 for selecting the desired data to be displayed, and to display generation circuitries 16 which generate alpha-numeric characters representing the stored data. The display generation circuitry is also connected to the local memory, as shown in FIG. 1. Also, the output of the display generation circuitry 16 is connected to a video display monitor 17.

Figure 2:
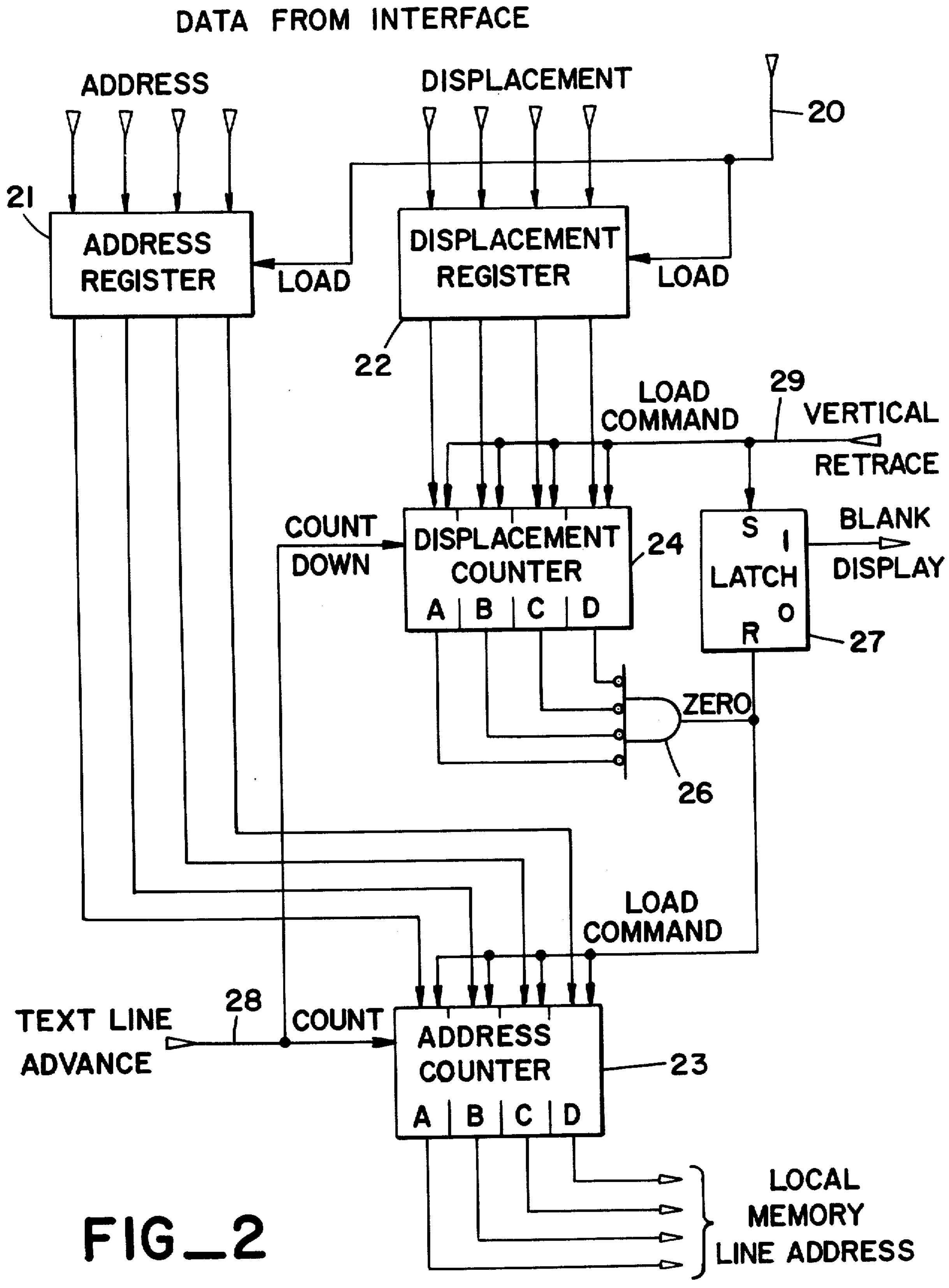
FIG. 2 is a block diagram representation of the display control device of the present invention.

The display control device of the present invention generally corresponds to the parameter memory 13 and the mapping circuitry 14 of FIG. 1. With reference to FIG. 2, the parameter memory includes an address register 21 and a displacement register 22. Both registers are loaded with data from the interface 11, upon receiving an actuating signal from line 20. The address register 21 is connected in parallel to an address counter 23. Likewise, a displacement register 22 is connected to a displacement counter 24. Both counters 23 and 24 are incremented by signals from line 28. Line 28 carries a text line advance signal provided by the display generation circuitry 16. The text line advance signal is generated every time the display of a text line is completed on the video display monitor.

The displacement counter 24 is also connected to line 29, which carries a signal synchronized to the vertical retrace signal of the video display monitor. This signal acts as a load command, so that the contents of the displacement register 22 may be loaded into the displacement counter 24 at each occurrence of a vertical retrace signal. Line 29 is also connected to the set input of a latch 27. The output of the latch provides a blanking signal to the video display monitor. The output of the displacement counter 24 is connected in parallel fashion to a NAND gate 26. The output of the NAND gate 26 is connected to the reset input of the latch 27. The output of the NAND gate 26 is also connected to the load command inputs of the address counter 23. The outputs of the address counter 23 are connected in parallel to the local memory 12.

It should be noted that the vertical retrace signal which is carried on line 29 occurs after the scanning beam of the video display monitor has reached the bottom of the text display area of the video screen. The vertical retrace signal sets the latch 27 which in response generates a blanking signal causing no text display to appear on the video display monitor. The address and displacement parameters are loaded into the address register 21 and displacement register 22 upon receiving an actuating signal from the central processing unit or local control circuitry in the display module, through line 20. During the vertical retrace interval, the displacement counter is loaded with the data contained in the displacement register. When the displacement counter 24 stores any number other than zero, the NAND gate 26 is inhibited from actuating and cannot reset the latch 27. Thus the data stored in the displacement counter 24 effectively prevents reset of the latch and maintains the blanking of the display on the video display monitor.

After the final video scan line of each line of text has occurred, the display generation circuitry 16 generates a text line advance signal. Each text line advance signal which constitutes a pulse on line 28 actuates the displacement counter 24 to count down by one. Thus the video display monitor is scanning text lines without displaying them, due to the action of the latch 27, and is counting down the displacement counter 24 each time a blanked-out text line is completed.

When the displacement counter reaches zero, the NAND gate 26 is actuated, and it in turn resets the latch 27. The blanking signal is thus terminated. At the same time the output of the NAND gate 26 causes the contents of the address register 21 to be loaded into the address counter 23. The next text line advance signal carried on line 28 will cause the address counter 23 to count up or down, depending on the manner in which the line 28 is connected to the address counter 23. As the counter 23 increments, it provides a new line address to the local memory 12. Thus the subjacent or superjacent text lines which are displayed will contain consecutive memory lines.

At the end of the last scan line, the vertical retrace signal carried on line 29 sets the latch 27 and loads the displacement counter 24 with the information contained in the displacement register 22. The entire process described in the foregoing is then reiterated.

Figure 3:
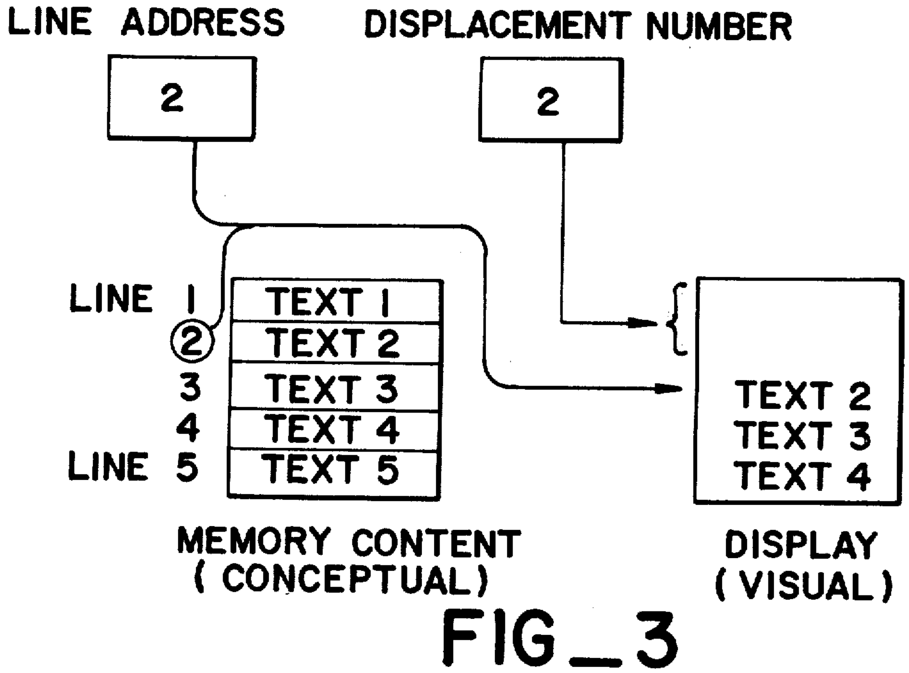
FIG. 3 is a chart depicting the manner in which the control device of the present invention operates on a video display.

The effect of the display control device of the present invention is shown graphically in FIG. 3. In this example of the operation of the invention, the line address stored in the address register 21 is two and the displacement number stored in the displacement register is also two. It may be seen that the line address causes the memory line two which contains text line two to be displayed on the video display monitor. The displacement number two causes the first two display lines of the video display monitor to be blanked so that the display commences with the third display line which displays the text line two.

The chart of FIG. 4 depicts the line numbers within the local memory 12 and the text lines corresponding to each line number. As shown in FIG. 5, when the line address equals one and the displacement number equals three, the first three display lines are blanked and the display commences with display line 4 which is the first line of the memory. With reference to FIG. 6, in which the line address equals one and the displacement number equals one, the first display line is blank and the display then commences with display line two. Likewise in FIG. 7 the line address equals three and the displacement number equals two. In this example the first two display lines will be blank and the third display line will indicate the third line of the memory.

It may be appreciated that any combination of line address numbers and displacement numbers may be provided to alter the format of the alpha-numeric display as desired. Furthermore, the line address numbers and displacement numbers stored in registers 21 and 22 may be changed periodically to cause the display to scroll up or down. For example, should the displacement number be incremented sequentially downwardly, the display will appear to scroll upward on the video display monitor. The line address numbers stored in the register 21 may also be incremented sequentially, so that new display lines appear at one edge of the video display monitor while previously displayed lines disappear. In this manner the format of the alpha-numeric display may be selected to flow in a manner which is easily readable, and may be altered to suit the operator or viewer.

The line address numbers and displacement numbers stored in the registers 21 and 22 may be provided by the central processing unit of the computer, or may be provided by the video display module. The manner in which these numbers are provided to the present invention is outside the purvue of the invention.

It may be appreciated that the display control device of the present invention permits the alpah-numeric display to continue without any direct involvement of the central processing unit. Further, the timing sequence of the control device is independent of the central processor. Thus, the amount of computing time required from the central processor to operate the video display module is minimized.

I claim:

1. In a video display module which includes a local data memory, character generation circuitry, and a display monitor having a display screen; a display control device comprising address storage means for storing a line address of said memory; address counter means for incrementing or decrementing said line address, said address counter means input connected to said address storage means and output connected to said local data memory; displacement storage means for storing a displacement parameter number proportional to the vertical distance between the top of said display screen and the beginning of the display; displacement counter means connected to the output of said displacement storage means for incrementing or decrementing said displacement parameter number; latch means for generating a video blanking signal; logic means connected to the output of said displacement counter means for resetting said latch means whenever said displacement counter means counts to a predetermined number; and vertical retrace signal means for resetting said latch means.

2. The display control device of claim 1, wherein said vertical retrace signal means enables the loading of said displacement counter means from said displacement storage means.

3. The display control device of claim 1, wherein said logic means also enables the loading of said address counter means from said address storage means.

4. The display control device of claim 1, further including text line advance signal means connected to both said counter means for incrementing said counter means.

* * * * *